US008330732B2

(12) United States Patent
Nutaro et al.

(10) Patent No.: US 8,330,732 B2
(45) Date of Patent: Dec. 11, 2012

(54) METHOD AND APPARATUS FOR AVIONIC TOUCHSCREEN OPERATION PROVIDING SENSIBLE FEEDBACK

(75) Inventors: Joseph J. Nutaro, Phoenix, AZ (US); Steven Paul Grothe, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1009 days.

(21) Appl. No.: 12/340,390

(22) Filed: Dec. 19, 2008

(65) Prior Publication Data

US 2010/0156809 A1   Jun. 24, 2010

(51) Int. Cl.
G06F 3/041 (2006.01)
(52) U.S. Cl. ..................................... 345/173; 340/407.1
(58) Field of Classification Search .................. None
See application file for complete search history.

(56) References Cited

U.S. PATENT DOCUMENTS

| 4,821,030 | A | 4/1989 | Batson et al. |
| 5,559,301 | A | 9/1996 | Bryan, Jr. et al. |
| 5,825,352 | A | 10/1998 | Bisset et al. |
| 6,822,635 | B2 | 11/2004 | Shahoian et al. |
| 7,148,875 | B2 | 12/2006 | Rosenberg et al. |
| 7,205,978 | B2 | 4/2007 | Poupyrev et al. |
| 7,215,329 | B2 | 5/2007 | Yoshikawa et al. |
| 7,324,094 | B2 | 1/2008 | Moilanen et al. |
| 7,327,348 | B2 | 2/2008 | Goldenberg et al. |
| 7,336,260 | B2 | 2/2008 | Martin et al. |
| 7,336,266 | B2 | 2/2008 | Hayward et al. |
| 7,564,449 | B2 * | 7/2009 | Layton et al. ................. 345/173 |
| 7,877,707 | B2 * | 1/2011 | Westerman et al. .......... 715/863 |
| 2003/0071858 | A1 | 4/2003 | Morohoshi |
| 2003/0184574 | A1 | 10/2003 | Phillips et al. |
| 2005/0024342 | A1 | 2/2005 | Young |
| 2007/0152984 | A1 | 7/2007 | Ording et al. |
| 2007/0198926 | A1 | 8/2007 | Joguet et al. |
| 2007/0222765 | A1 | 9/2007 | Nyyssonen |
| 2008/0117175 | A1 | 5/2008 | Linjama et al. |
| 2008/0165255 | A1 | 7/2008 | Christie et al. |
| 2009/0167704 | A1 * | 7/2009 | Terlizzi et al. ................. 345/173 |

OTHER PUBLICATIONS

European Search Report dated May 6, 2010, for Application No. 09178124.

* cited by examiner

*Primary Examiner* — Jason Olson
(74) *Attorney, Agent, or Firm* — Ingrassia Fisher & Lorenz, P.C.

(57) ABSTRACT

A method is provided for avionic touchscreen operation. The method includes the steps of displaying one or more user input devices on a touchscreen panel, receiving user inputs on a face of the touchscreen panel, and generating input signals in response to the user inputs. The method further includes the steps of generating operational signals in response to comparing the input signals to predetermined user input signals, adjusting one or more avionic operation parameters in response to the operational signals, and providing user sensible outputs in response to the operational signals and in accordance with the user inputs. The step of providing user sensible output includes providing two or more user sensible outputs selected from the group of providing user sensible outputs including providing visual outputs, providing audible outputs and providing tactile outputs. Alternatively, the one or more user input devices displayed on the touchscreen panel includes one or more knobs.

10 Claims, 6 Drawing Sheets

METHOD AND APPARATUS FOR AVIONIC TOUCHSCREEN OPERATION PROVIDING SENSIBLE FEEDBACK

FIELD OF THE INVENTION

The present invention generally relates to avionic uses of touchscreen user interfaces, and more particularly relates to a method and apparatus for touchscreen operation as a user interface in avionic applications wherein the touchscreen provides user sensible feedback.

BACKGROUND OF THE INVENTION

Programmable touchscreens have been utilized as user input interfaces to reduce the size and number of input devices, such as replacing keyboards, keypads, knobs and/or switches. In avionic applications, programmable touchscreens could reduce flight deck panel clutter by replacing knobs, switches and other user input devices. In addition, the reduction of the knobs, switches and other user input devices on the flight deck could reduce the cost of an aircraft by removing the need for complex mechanical panels, extensive interface electronics, costly installation, wiring and numerous spare parts for maintenance. However, conventional programmable touchscreens do not provide the visual and tactile feedback necessary to maintain flight crew awareness of actions taken and/or completed.

Thus, what is needed is a method and apparatus for implementing an avionics touchscreen that takes advantage of the flexibility of programmable touchscreens while retaining the sensory feedback advantages of the knobs, switches and other user input devices replaced. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for avionic touchscreen operation. The method includes the steps of displaying one or more user input devices on a touchscreen panel, receiving user inputs on a face of the touchscreen panel, and generating input signals in response to the user inputs. The method further includes the steps of generating operational signals in response to comparing the input signals to predetermined user input signals, adjusting one or more avionic operation parameters in response to the operational signals, and providing two or more user sensible outputs in response to the operational signals and in accordance with the user inputs. The step of providing two or more user sensible outputs includes providing two or more user sensible outputs selected from the group of user sensible outputs including providing visual outputs, providing audible outputs and providing tactile outputs.

In addition, a method for avionic touchscreen operation is provided which includes the steps of displaying one or more user input devices on a touchscreen panel and receiving user inputs on a face of the touchscreen panel, wherein the one or more user input devices includes one or more knobs. The method further includes the steps of generating input signals in response to the user inputs, generating operational signals in response to comparing the input signals to predetermined user input signals, adjusting one or more avionic operation parameters in response to the operational signals, and providing user sensible output in response to the operational signals and in accordance with the user inputs.

Further, an avionics input device is provided. The avionics input device includes a touchscreen panel, a haptic feedback device, an input decoder, a storage device and a processor. The touchscreen panel visually displays one or more user input devices in response to display signals received thereby and includes a face for receiving user inputs thereon, the touchscreen panel generating input signals in response to the user inputs. The haptic feedback device is mechanically coupled to the touchscreen panel for vibrating the touchscreen panel at a frequency and an amplitude determined in response to haptic feedback signals received thereby. The input decoder is coupled to the touchscreen panel and generates operational signals in response to comparing the input signals to predetermined user input signals. The storage device is coupled to the input decoder and stores the predetermined user input signals. And the processor is coupled to the input decoder for adjusting one or more avionic operation parameters in response to the operational signals. The processor also provides the display signals to the touchscreen panel and the haptic feedback signals to the haptic feedback device. Further, the processor generates user sensible output signals comprising two or more of audio feedback signals, visual feedback signals or tactile feedback signals in response to the operational signals and in accordance with the user inputs. The processor is coupled to one or more audio devices for providing the audio feedback signals thereto. In addition, the processor alters the display signals provided to the touchscreen panel in response to the visual feedback signals. Also, the processor alters the haptic feedback signals provided to the haptic feedback device in response to the tactile feedback signals.

BRIEF DESCRIPTION OF THE DRAWINGS

The present invention will hereinafter be described in conjunction with the following drawing figures, wherein like numerals denote like elements.

FIG. 3, comprising

FIG. 5, comprising

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
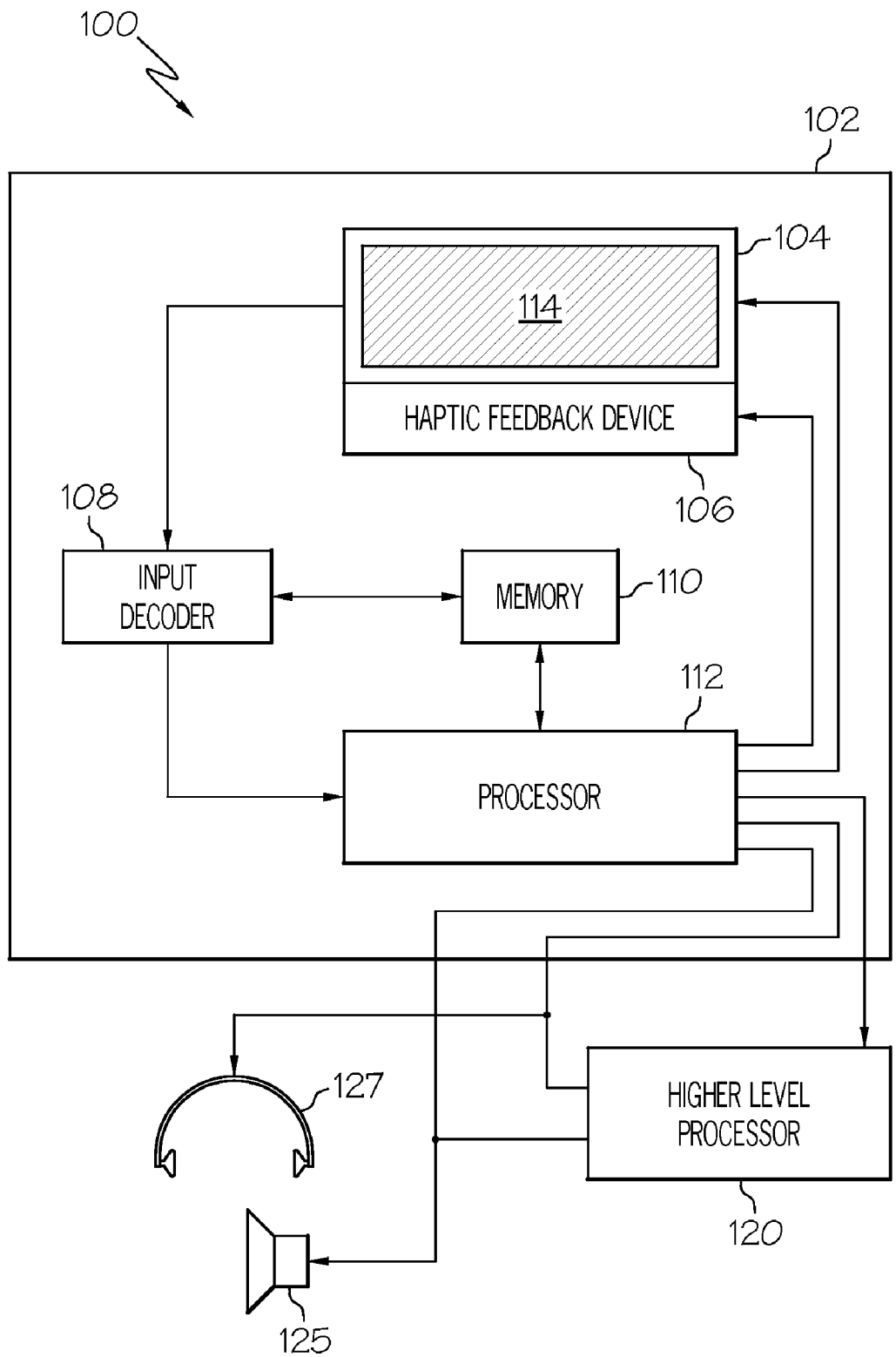
FIG. 1 illustrates a block diagram of an avionics system including an avionics input device in accordance with the present embodiment.

Referring to FIG. 1, an avionics system 100 for providing signals for operating an airplane includes an avionics input device 102 in accordance with an embodiment of the present invention. The avionics input device 102 includes a touchscreen panel 104, a haptic feedback device 106, an input decoder 108, a storage device 110 and a processor 112. The touchscreen panel 104 visually displays one or more user input devices in response to display signals received thereby. The user input devices could be knobs, levers, selector switches, rocker switches or push buttons which are displayed on the touchscreen panel 104 in response to flight crew selection or in response to flight parameters, such as a phase of the flight (e.g., ascending, descending) or detection of a flight event (e.g., air traffic control handoff). The knobs, levers, selector switches, rocker switches or push buttons may include a knob to adjust a radio frequency, or a barometric correction to altitude or a switch to select alternate equipment such as a right or left inertial reference system. Display of the one or more user input devices on the touchscreen panel 104 advantageously reduces the number of knobs, switches and levers on the flight deck, thereby uncluttering the flight deck and reducing the cost of the aircraft by removing the need for complex mechanical panels, extensive interface electronics, costly installation and wiring, and spares panels and parts for aircraft maintenance.

In accordance with the present embodiment, the avionics input device 102 provides visual, manual feel and audio feedback to the flight crew by providing an improved "look and feel" for the user input devices displayed on the touchscreen panel 104. For example, the touchscreen panel 104 provides visual feedback to the flight crew by changing the size, the color or a legend on a user input device depicted on the touchscreen panel 104. The touchscreen panel 104 also includes a face 114 for receiving user inputs from the flight crew, the touchscreen panel 104 generating input signals in response to the user inputs on the face 114. Such user inputs may include multitouch inputs (e.g., identifying simultaneous user inputs at multiple locations on the face 114) such as those made by a user rotating a knob displayed on the touchscreen panel 104. The input decoder 108 is coupled to the touchscreen panel 104 and generates operational signals in response to comparing the input signals received from the touchscreen panel 104, including multitouch inputs, to predetermined user input signals retrieved from the storage device 110, the storage device 110 storing the predetermined user input signals.

When manipulating the user input devices depicted on the touchscreen panel 104, the flight crew receives tactile feedback via the haptic feedback device 106. The haptic feedback device 106 is mechanically coupled to the touchscreen panel 104 and includes a piezoelectric device or an electromechanical actuator device which vibrates the touchscreen panel 104 at a predetermined frequency and a predetermined amplitude determined in response to haptic feedback signals received by the haptic feedback device 106 to provide appropriate tactile feedback sensations to the user. The visual feedback provided by on the touchscreen panel 104 and the tactile feedback provided by the haptic feedback device 106 combine to maintain flight crew awareness by providing a suitable "look and feel" for operation of the user input devices depicted on the touchscreen panel 104 while taking advantage of the flexibility and abilities of the touchscreen panel 104 capabilities.

The processor 112 is coupled to the input decoder 108 for adjusting one or more avionic operation parameters in response to the operational signals by providing operation parameter adjusting signals to a higher level processor 120. The higher level processor 120 may be one or more processors in any one of a number of avionics devices such as radio devices or braking systems, or the higher level processor 120 may be included in an integrated modular avionics system, such as the avionics system 100.

The processor 112 provides the display signals to the touchscreen panel 104 and the haptic feedback signals to the haptic feedback device 106. Further, the processor 112 generates user sensible output signals comprising two or more of audio feedback signals, visual feedback signals or tactile feedback signals in response to the operational signals and in accordance with the user inputs. The processor 112 is coupled to one or more audio devices, such as flight deck speakers 125 and flight crew headphones 127, for providing the audio feedback signals thereto and the audio feedback signals may be routed through the higher level processors(s) 120 rather than, or in addition to, directly from the 102 device. In addition, the processor 112 alters the display signals provided to the touchscreen panel 104 in response to the visual feedback signals. Also, the processor 112 provides and/or alters the haptic feedback signals provided to the haptic feedback device 106 in response to the tactile feedback signals.

Figure 2:
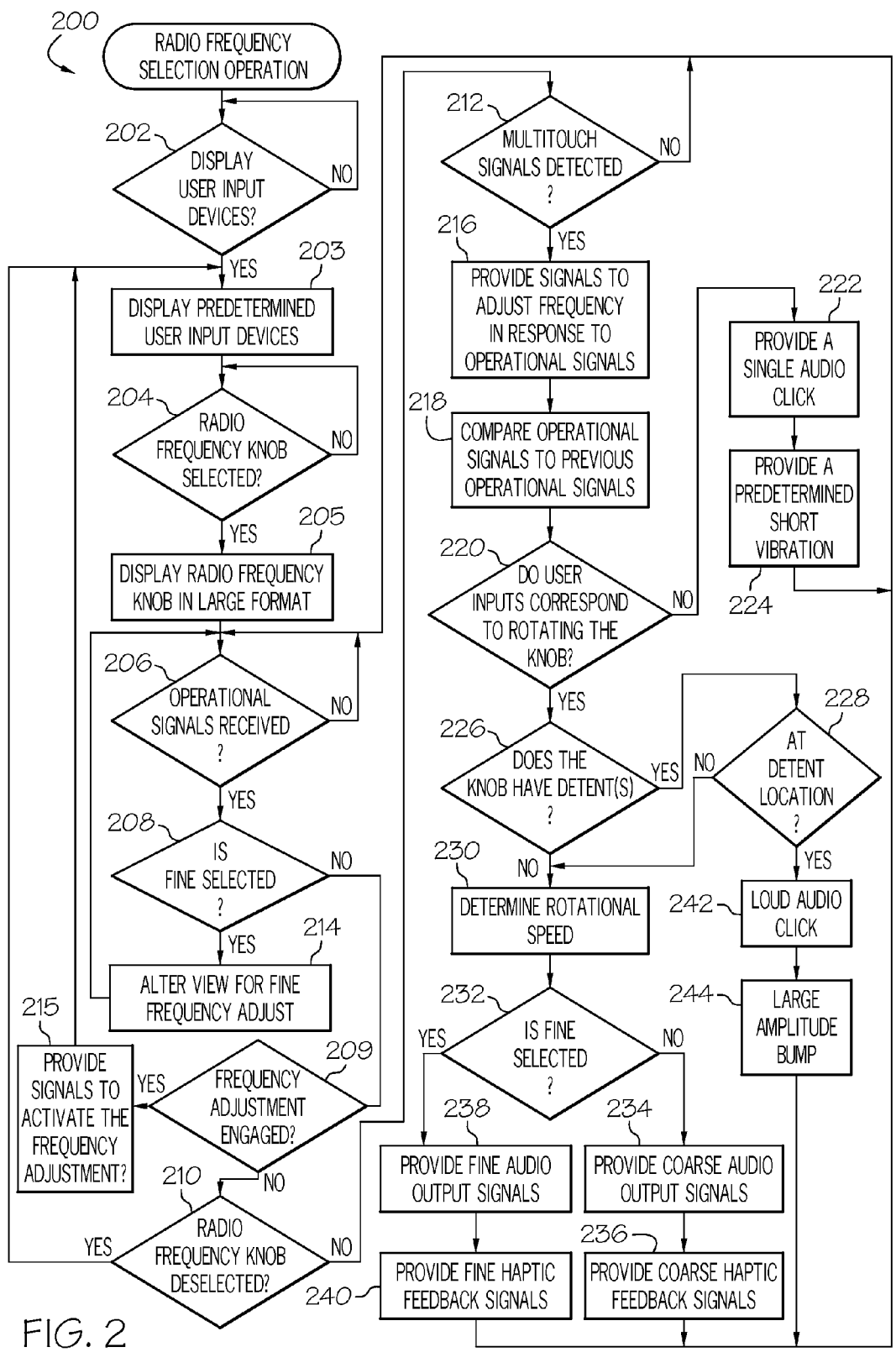
FIG. 2 illustrates a flowchart of an operation of the avionics input device of FIG. 1 in accordance with the present embodiment.
Figure 3A:
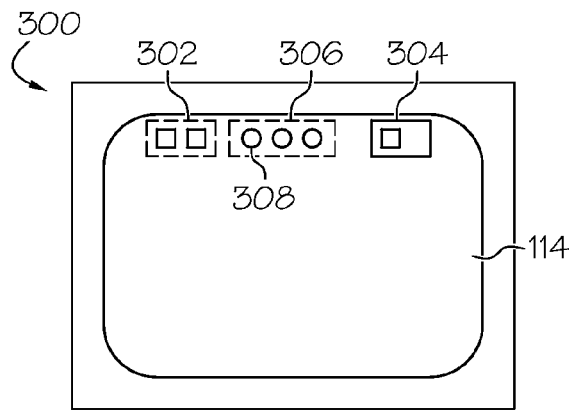
FIGS. 3A to 3H, illustrate representations of visual displays generated during the avionics input device operation depicted in FIG. 2 in accordance with the present embodiment.

Referring next to FIG. 2, a flowchart 200 depicts the operation of the processor 112 in accordance with an operation of the avionics input device 102, a radio frequency selection operation, in accordance with the present embodiment. Initially, the processor 112 determines 202 whether to display predetermined user input devices on the touchscreen panel 104. The processor 112 determines 202 which predetermined user input devices to display and whether to display the predetermined user input devices in response to either a user input from the flight crew or a flight parameter such as a phase of the flight (e.g., time, altitude, or aircraft attitude (e.g., ascending, descending)), a location of the aircraft or detection of a flight event, such as detection of an air traffic control handoff, the flight parameter information provided to the processor 112 by the higher level processor(s) 120. When the processor 112 determines 202 to display the predetermined user input devices, the predetermined user input devices (i.e., the user input devices selected or appropriate to control of the aircraft in response to the flight parameter) are displayed 203 on the touchscreen panel 104. Referring to FIG. 3A, a visual display 300 depicts an exemplary visual display on the face 114 of the touchscreen panel 104 including six predetermined user input devices: two switches 302, a slide switch 304 and three knobs 306, including a radio frequency tuning knob 308. While customary switches and knob shapes are shown on the representation 300, the shape of the switch and/or knob could be presented in a form indicative of its function, such as a wheel icon or a circuit breaker icon, thereby providing additional flight crew feedback.

Figure 3B:
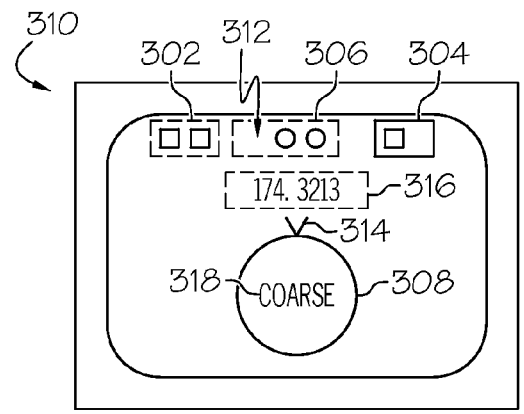

Returning to the flowchart 200, the processor 112 awaits determination that the radio frequency tuning knob 308 is selected 204. The processor 112 determines that the radio frequency tuning knob 308 is selected 204 in response to receiving operational signals from the input decoder 108 indicating that a predetermined user input has been detected on the touchscreen panel 104 indicating user selection of the radio frequency tuning knob 308 (e.g., a user tapping the touchscreen panel at the location of the radio frequency tuning knob 308). When the radio frequency tuning knob 308 is selected 204, the processor 112 provides signals to thereafter display 205 the predetermined user input devices on the touchscreen panel with the selected radio frequency tuning knob 308 displayed in a large visual format. Referring to FIG. 3B, a representation 310 depicts a second exemplary visual display on the touchscreen 114 in accordance with the present embodiment wherein the selected radio frequency tuning knob 308 is displayed in a large visual format 205 with a legend "COARSE" 318 depicted thereon. The two switches 302, the slide switch 304 and other ones of the three knobs 306 remain on the screen in a small visual format with a space 312 indicating where the radio frequency tuning knob 308 resides when not selected. To assist the flight crew in tuning the radio frequency, a marker 314 indicating a selected location on the radio frequency tuning knob 308 corresponding to a currently selected radio frequency is displayed. In an alternate embodiment (as shown by the dashed line representation), a numerical frequency readout 316 may be provided above the marker 314 wherein the currently selected radio frequency is numerically depicted, the radio frequency information being provided from the higher level processor(s) 120.

While other operations could be performed from the touchscreen display of FIG. 3A, the description herein focuses on the radio frequency selection operation in accordance with the present embodiment and from the description herein those skilled in the art will understand how to design additional touchscreen enabled operations. Referring back to the flowchart 200, after displaying the selected radio frequency tuning knob 308 in the large visual format 205, user inputs received on the touchscreen panel 104 correspond to actuation of the radio frequency tuning knob 308. Therefore, the processor 112 next awaits reception 206 of operational signals in accordance with user inputs on the touchscreen panel 104. When operational signals are received 206, the processor 112 determines whether the operational signals indicate that fine frequency tuning is selected 208, the frequency tuning knob 308 is engaged 209, the frequency tuning knob 308 is deselected 210, or multitouch user inputs have been received 212.

Figure 3C:
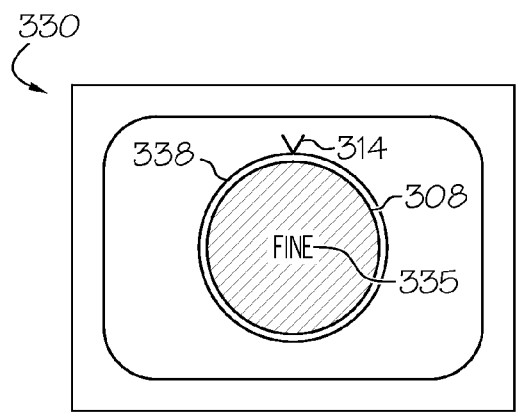

In accordance with the present embodiment, the frequency tuning knob 308 has two modes of operation: coarse tuning over a first frequency range and fine tuning over a second frequency range within the first frequency range. As depicted in FIG. 3B, the default mode of operation is coarse tuning as identified by the legend "COARSE" 318. In response to reception of operational signals 206 corresponding to a predetermined user input (e.g., a single user tap on the touchscreen over the frequency tuning knob 308), the processor 112 determines that fine frequency tuning has been selected 208, thereby changing the frequency range of the frequency tuning knob 308. The processor 112 then provides appropriate display signals to the touchscreen panel 104 to alter 214 the visual appearance of the frequency tuning knob 308 by one or more of altering the size of, altering the color of or altering a legend on the frequency tuning knob 308. Referring to FIG. 3C, a visual display 330 corresponding to user selection of fine frequency tuning is depicted. The frequency tuning knob 308 is enlarged and the color is changed. In addition, the legend "FINE" 335 is now displayed on the frequency tuning knob 308. While, in accordance with the present embodiment, only one of the alterations may be made to the frequency tuning knob 308, multiple alterations such as the size, color, and legend alterations shown in visual display 330 improves crew awareness. Additional alterations could be added such as changing the scaling 334 around the outside of the knob to correspond to the second frequency range of the fine tuning operation or removing the other switches and knobs 302, 304, 306 form the visual display 330. Referring to the flowchart 200, after the visual appearance of the frequency tuning knob 308 is altered 214, processing returns to await reception by the processor 112 of additional operational signals 206.

In response to reception of operational signals 206 corresponding to a predetermined user input, the processor 112 further determines whether the radio frequency tuning knob 308 is engaged 209. As described below, the operational signals (e.g., in terms of radio frequency adjustment, the frequency information) is passed to the higher level processors(s) 120, but the frequency of the avionics radio is not adjusted or reset without a predetermined engagement user input 209. Once a frequency adjustment procedure in accordance with the preferred embodiment is completed, the display alters to await an engagement user input. For example, an additional button may be displayed on the touchscreen panel 104 which, when an appropriate touchscreen input is received thereon, engages the frequency adjustment 215 by providing appropriate signals to the higher level processor(s) to instruct the radio to tune to the indicated frequency. Alternatively, an additional user input device (e.g., a push button on the flight deck coupled to the processor 112). Use of the additional user input device or an additional engagement button on the touchscreen panel 114 is especially desired for touchscreen panel 114 inputs where additional safety of action is a concern, the additional user input device or additional engagement button independent of the knob 308 allows for an independent engagement input 209 to be detected before signals are provided 215 to the higher level processors(s) 120 confirming that the flight crew truly intended the action to take place. Engagement detection step 209 independent of the touchscreen panel 114 inputs which alter the flight deck parameter such as radio frequency helps eliminate extraneous or accidental signals from the touchscreen panel 114 from initiating aircraft action.

Figure 3D:
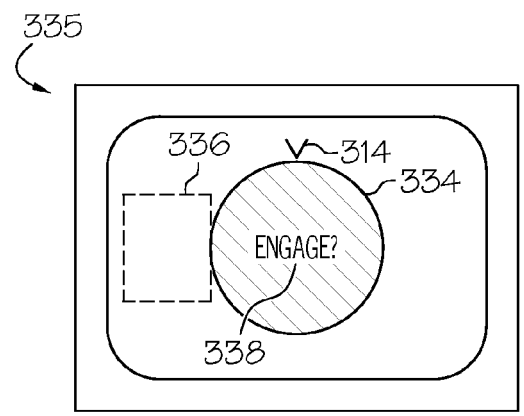

Referring to FIG. 3D and display 335, alternatively to an additional engagement button 336 (shown in dotted line) separate from the knob 308, the appearance of the knob 308 may be altered (e.g., adding the legend 338 "ENGAGE?") after the frequency is set. Thus, detection 209 of a predetermined engagement input such as a tap, a tap that requires longer than a normal touch, or a two finger touch on the knob 308 after the legend 338 is displayed thereon causes the processor 112 to send 215 appropriate signals to the higher level processor(s) to change the frequency of the radio. In accordance with the preferred embodiment, the legend 338 displayed on the knob 308 advantageously replaces a separate engage button on the screen or elsewhere on the flight deck while allowing the pilot to set the frequency ahead of time thereby allowing the flight crew to listen on the previous frequency then engage the frequency adjustment only when needed. After engaging the frequency adjustment 215, processing returns to step 203 and the predetermined user input devices are displayed 203 on the touchscreen panel 104 as shown in visual display 300 (FIG. 3A).

In response to reception of operational signals 206 corresponding to another predetermined user input (e.g., a double user tap on the touchscreen over the frequency tuning knob 308 or a user tap on the touch screen over another one of the predetermined user input devices (i.e., the two switches 302, the slide switch 304, or the other knobs 306 (FIG. 3B)), the processor 112 determines that the radio frequency tuning knob 308 is deselected 210. Processing then returns to step 203 and the predetermined user input devices are displayed 203 on the touchscreen panel 104 as shown in visual display 300 (FIG. 3A).

Figure 3E:
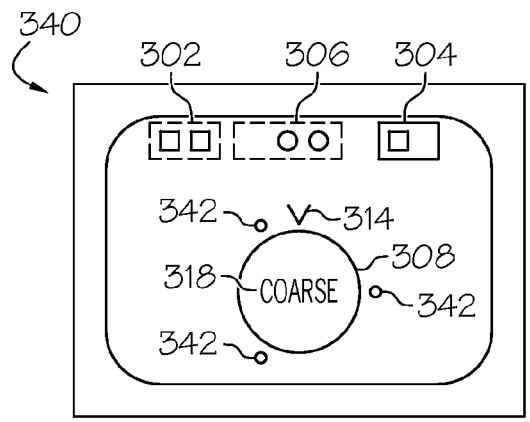

When operational signals are received 206 corresponding to multitouch user inputs 212, the processor 112 determines that the user inputs are an authenticated user input and provides 216 operation parameter adjusting signals to the higher level processor(s) 120 (FIG. 1) to adjust the frequency of the aircraft radio in response to the operational signals received by the radio frequency tuning knob 308. In accordance with the preferred embodiment, detection of multitouch user inputs 212 is utilized to determine if a user input is an authenticated user input. As seen from the flowchart 200, only an authenticated user input 212 will allow operation parameter adjusting signals to be forwarded to the higher level processor(s) 120. The authenticated user input may include a predetermined number of simultaneous touches to qualify as detection of multitouch signals 212 in order to distinguish an authenticated user input from extraneous touches on the touchscreen panel 114. Referring to FIG. 3E, a visual display 340 depicts multitouch user inputs 342 (depicted for illustrative purposes only) on the touchscreen panel 114 around the radio frequency tuning knob 308. While three user inputs 342 are depicted (corresponding to three fingers touching the touchscreen panel 104 to "grasp" the radio frequency tuning knob 308), the number of multitouch user inputs could be as small as two or as large as a predetermined number (typically five, corresponding to five fingers on one hand), the number corresponding to the number of simultaneous touches which qualify as an authenticated user input for detection of multitouch signals 212 in accordance with the present embodiment.

Figure 3F:
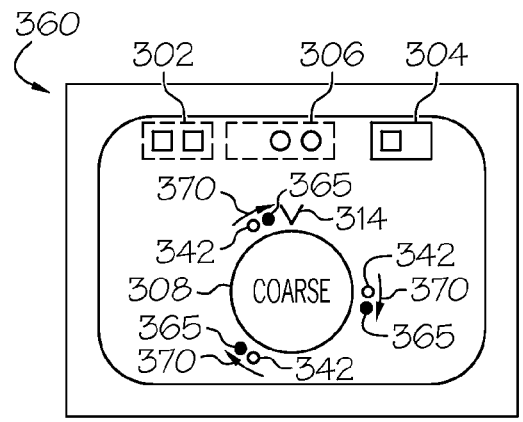

The processor 112 also compares 218 the operational signals received with previously received operational signals to determine 220 whether the multitouch user inputs corresponding operational signals received correspond to multitouch user inputs "rotating" the radio frequency tuning knob 308. Referring to FIG. 3F, a visual display 360 depicts the multitouch user inputs 342 and previous multitouch user inputs 365 on the touchscreen panel 114 around the radio frequency tuning knob 308. The multitouch user inputs 342 as compared to the previous multitouch user inputs 365 correspond to multitouch user inputs "rotating" the radio frequency tuning knob 308 in the direction of arrows 370.

If the processor 112 determines 220 that the operational signals received do not correspond to multitouch user inputs "rotating" the radio frequency tuning knob 308, the processor 112 provides 222 audio signals to the audio output device(s) 125 and/or 127 (FIG. 1) to generate a predetermined short audio sound (e.g., a single audio click). The processor 112 also provides 224 haptic feedback signals to the haptic feedback device 106 to generate a predetermined short vibration of the touch screen panel 104. Processing then returns to await reception 206 of the next operational signals.

Figure 3G:
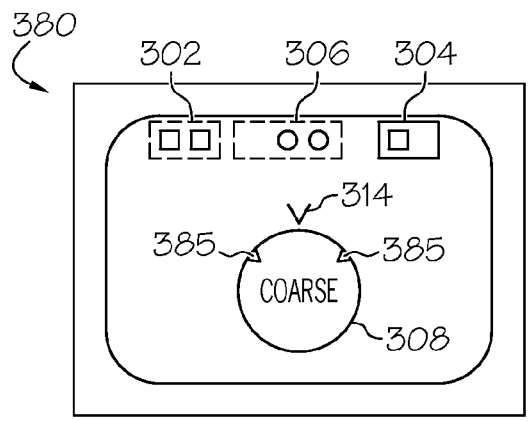
Figure 3H:
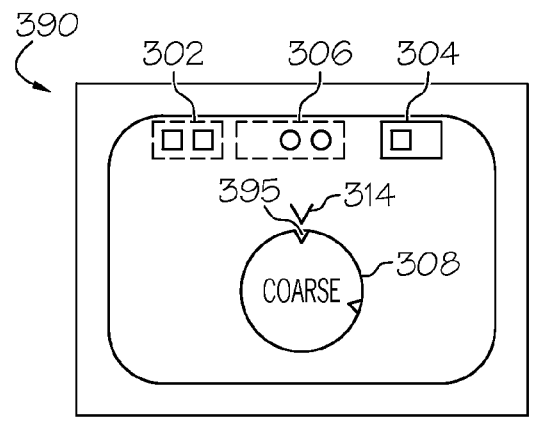

If the processor 112 determines 220 that the operational signals received correspond to multitouch user inputs "rotating" the radio frequency tuning knob 308, the processor 112 determines 226 whether the radio frequency tuning knob 308 includes detents on the radio frequency tuning knob 308 corresponding to predetermined frequency settings. Referring to FIG. 3G, a visual display 380 depicts the radio frequency tuning knob 308 including detents 385. If the processor 112 determines 220 that the radio frequency tuning knob 308 includes detents on the radio frequency tuning knob 308, the processor 112 next determines whether the radio frequency tuning knob 308 has been adjusted to select 228 one of the predetermined frequency settings corresponding to one of the detents. Referring to FIG. 3H, a visual display 390 depicts the radio frequency tuning knob 308 wherein a detent 395 is rotated to a position below the marker 314. In this manner, the radio frequency tuning knob 308 has been adjusted to select the predetermined frequency setting corresponding to the detent 395.

Referring back to the flowchart 200 (FIG. 2), if the processor 112 determines 228 that the radio frequency tuning knob 308 has not been adjusted to select one of the predetermined frequency settings corresponding to one of the detents 385 (FIG. 3G), the processor 112 determines 230 the "rotational speed" of the radio frequency tuning knob 308 and then provides predetermined audio signals to the audio output devices 125, 127 corresponding to the "rotational speed" and the assigned function of the radio frequency tuning knob 308 and predetermined haptic feedback signals to the haptic feedback device 106 to vibrate the touchscreen panel at a predetermined frequency and a predetermined amplitude corresponding to the "rotational speed" and the assigned function of the radio frequency tuning knob 308, thereby providing appropriate audio and tactile feedback to the flight crew indicating the "rotational speed" of the radio frequency tuning knob 308 and the assigned function (e.g., coarse tuning or fine tuning) of the radio frequency tuning knob 308.

Thus, if the fine frequency tuning has not been selected 232, the processor 112 provides 234 predetermined coarse frequency tuning audio signals to one or more of the audio output devices 125, 127 corresponding to the "rotational speed" and provides 236 predetermined haptic feedback signals to the haptic feedback device 106 to vibrate the touchscreen panel at a predetermined coarse frequency tuning amplitude and frequency corresponding to the "rotational speed". If, on the other hand, the fine frequency tuning has been selected 232, the processor 112 provides 238 predetermined fine frequency tuning audio signals to one or more of the audio output devices 125, 127 corresponding to the "rotational speed" and provides 240 predetermined haptic feedback signals to the haptic feedback device 106 to vibrate the touchscreen panel at a predetermined fine frequency tuning amplitude and frequency corresponding to the "rotational speed".

For example, the processor 112 could provide audio signals that generate a clicking sound at the audio output devices, the frequency of the clicks varying in correspondence with the "rotational speed" and the predetermined coarse frequency tuning audio signals having a first amplitude, while the predetermined fine frequency tuning audio signals have a second amplitude. Alternatively, the amplitude for the predetermined coarse frequency tuning audio signals and the predetermined fine frequency tuning audio signals could be equivalent while the audio texture (e.g., type of clicking or sound of each click) could be different between the predetermined coarse frequency tuning audio signals and the predetermined fine frequency tuning audio signals. Likewise, the processor 112 could provide varying tactile feedback by providing haptic feedback signals having a predetermined frequency determined in response to the "rotational speed" and the function (e.g., fine or coarse tuning) of the radio frequency tuning knob 308 and having a predetermined amplitude determined in response to the "rotational speed" and the function (e.g., fine or coarse tuning) of the radio frequency tuning knob 308.

After the processor 112 provides the appropriate audio signals 234, 238 and haptic feedback signals 236, 240, processing returns to await reception 206 of the next operational control signals. In this manner, as the "rotational speed" of the radio frequency tuning knob 308 varies, the audio feedback is varied by varying the audio signals 234, 238 and the tactile feedback (i.e., the vibration of the touchscreen panel) is varied by varying the haptic feedback signals 236, 240. In addition, the audio and tactile feedback indicates to the user whether coarse frequency tuning or fine frequency tuning is selected by varying the audio signals 234, 238 and the haptic feedback signals 236, 240.

When the processor 112 determines 228 that the radio frequency tuning knob 308 has been adjusted to select one of the predetermined frequency settings corresponding to one of the detents 385 (FIG. 3G), audio signals having a large predetermined amplitude are provided 242 to the audio output devices 125, 127 to generate a loud amplitude click. In addition, haptic feedback signals having a large predetermined amplitude are provided 244 to the haptic feedback device to generate a large amplitude bump of the touchscreen. In this manner, audio and tactile feedback is provided to the user "rotating" the radio frequency tuning knob 308 in a manner similar to mechanically rotated knobs having detents to facilitate selection of one of the predetermined frequency settings corresponding to one of the detents 385 (FIG. 3G). After the processor 112 provides the appropriate audio signals 242 and haptic feedback signals 244, processing returns to await reception 206 of the next operational control signals.

While FIG. 2 and the visual displays 300 (FIG. 3A), 310 (FIG. 3B), 330 (FIG. 3C), 335 (FIG. 3D), 340 (FIG. 3E), 360 (FIG. 3F), 380 (FIG. 3G), and 390 (FIG. 3H) depict operation of the processor 112 in accordance with a radio tuning operation, those skilled in the art will understand that the teaching provided herein provide a basis for designing and enabling any number of avionic operations utilizing an avionic input device 102 in accordance with the present embodiment which provides visual, audio and/or tactile feedback to the user when utilizing switches 302, slide switches 304, knobs 306, levers or other predetermined input devices depicted on the touchscreen panel 104. For example, the audio and/or tactile feedback may be used to indicate variations other than speed of rotation of a knob. In accordance with an alternative embodiment, the knob 308 may be used to control a lighting intensity of flight deck lighting and the tactile feedback and audio feedback could be increased as the lighting is instructed to brighten.

Figure 4:
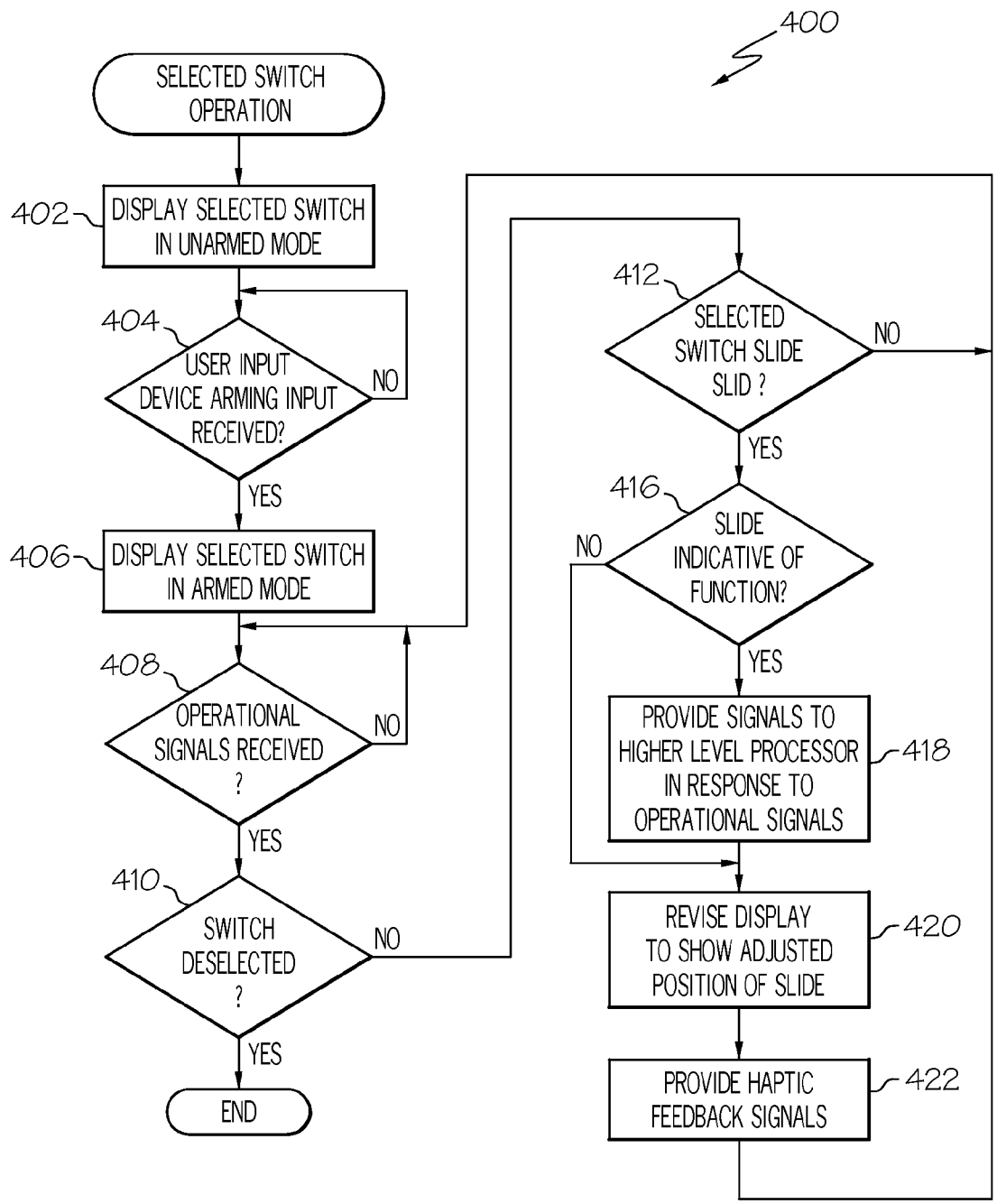
FIG. 4 illustrates a flowchart of an alternate operation of the avionics input device of FIG. 1 in accordance with the present embodiment.

Referring to FIG. 4, a flowchart 400 of a selected switch operation of the avionics input device 102 in accordance with the present embodiment is shown. On the flight deck, many switches and controls are protected from accidental activation by providing separate arming buttons or switch covers, thereby providing additional safety protection to prevent actions which may place an aircraft at risk. In accordance with the alternate operation of the avionic input device 102 depicted in the flowchart 400, accidental activation of a selected switch is controlled by both visual feedback (i.e., a legend such as "UNARMED" and, perhaps a color of the switch (e.g., red) or a shape of the switch (e.g., having an "X" covering the switch)). Thus, while the selected switch is unarmed, any user input will not activate the switches function nor will it alter a visual display of the selected switch.

Figure 5A:
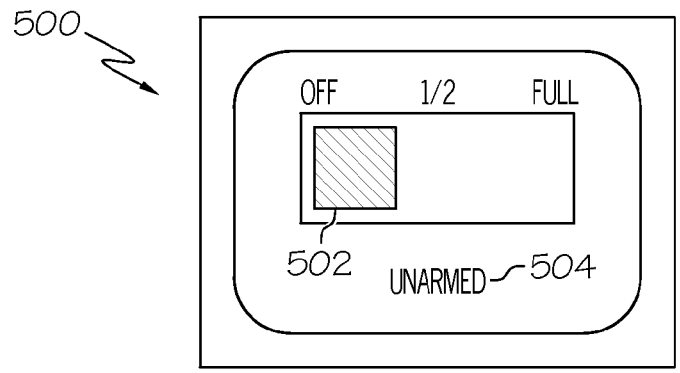
FIGS. 5A to 5C, illustrate visual displays for the alternate operation of the avionics input device depicted in FIG. 4 in accordance with the present embodiment.
Figure 5B:
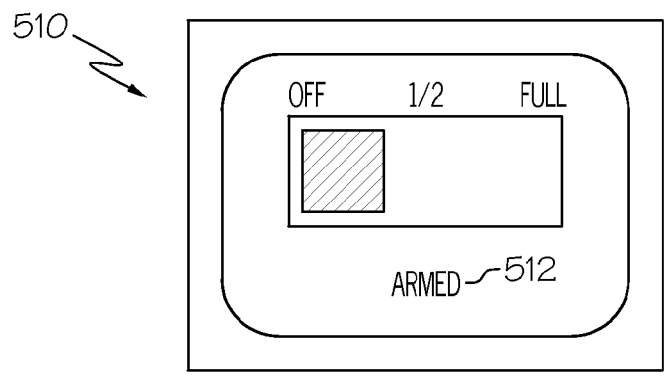

In accordance with the alternate operation, initially, an unarmed selected switch is displayed 502. Referring to FIG. 5A, a visual display 500 of a selected slide switch 502 on the face 114 of the touchscreen panel 104 is shown. The selected slide switch 502 is red in color and is in the OFF position. In addition, the legend "UNARMED" 504 is displayed below the switch 502. Referring back to the flowchart 400, processing will not proceed until a user input device arming input is received 404. The user input device arming input can be provided by a predetermined user input at a predetermined portion of the touchscreen display 114 or could be a user input on a user input device connected to the higher level processor 120 to unlock or arm the switch 502. When the user input device arming input is received 404, an armed selected switch is displayed 406 (i.e., the display is altered to depict the selected switch in the armed state). Referring to FIG. 5B, a visual display 510 depicts the selected switch 502 in the armed state. The legend has been altered to display the legend "ARMED" 512. In addition, the color of the selected switch 502 may be altered to another color, such as green.

While the selected switch 502 is displayed 406 in the armed state, the processor 112 awaits reception 408 of any operational signals. While not shown in flowchart 400, processing could await only for a predetermined time for operational signals 408 and, if no operational signals are received 408 within the predetermined time, processing automatically deselects 410 the selected switch. When operational signals are received 408, the processor determines whether the operational signals correspond to deselecting 410 the selected switch or operation 412 of the selected switch (in this instance, sliding the selected slide switch 502 to a new position). When the selected switch is deselected 410, the selected switch operation ends 414 and the processor returns to other operational routines.

Figure 5C:
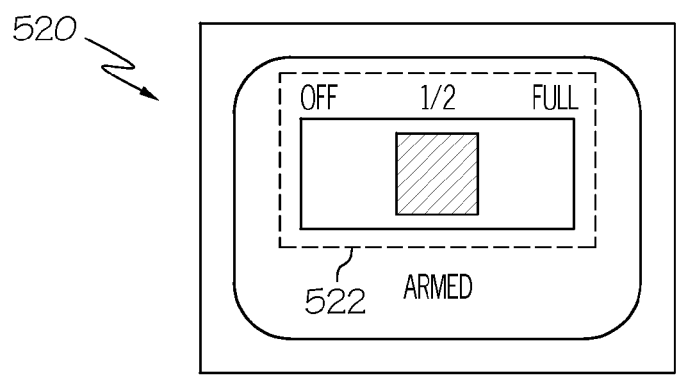

When the selected slide switch 502 is slid to a new position, the processor 112 determines 416 whether the new position is indicative of a predetermined function of the selected slide switch 502. If the processor 112 determines 416 that the new position is indicative of a predetermined function of the selected slide switch 502, the processor 112 provides 418 operation parameter adjusting signals to the higher level processor 120 (FIG. 1) to initiate the predetermined function indicated by the new position of the selected slide switch 502. Then, whether the new position is indicative of a predetermined function of the selected slide switch 502 or not, an altered visual display is displayed 420 (i.e., the display is altered to depict the selected switch in the new position). Referring to FIG. 5C, a visual display 520 depicts the selected slide switch 502 with the slide 522 in the new position. In addition to the visual feedback provided by the altered visual display 520, the processor 112 provides 422 haptic feedback signals to the haptic feedback device 106 to vibrate the touchscreen panel, thereby providing tactile feedback to the flight crew. While not shown in the flowchart 400, a detent could be identified for each position of the selected slide switch 502 that is indicative of a predetermined function and additional tactile and/or audio feedback could be provided in response to the detents as described hereinabove. After supply of the user sensible feedback 418, 420, processing returns to await reception 408 of the next operational signals. Optionally, processing could automatically lock or unarm the slide switch 502 and return to await reception of a user input device arming input 404.

While one procedure for arming a touchscreen panel 114 displayed input device has been described in the flowchart 400, a predetermined arming input may be inputted in other manners. For example, an input device coupled to the higher level processor 120 or the processor 112 for arming a touchscreen panel 114 displayed input device could be a flight deck switch which is directly coupled to the processor 112, 120, a command passed from the higher level processors(s) 120, or a predetermined input on another screen displayed on the touchscreen panel 114, such as a menu for authorized actions displayed in response to a flight parameter or a crew input.

Thus it can be seen that a method and apparatus for implementing an avionics touchscreen that takes advantage of the flexibility of programmable touchscreens while retaining the sensory feedback advantages of the knobs, switches and other user input devices replaced has been provided. While at least one exemplary embodiment has been presented in the foregoing detailed description of the invention, it should be appreciated that a vast number of variations exist. For example, though a knob 308 was used as the representative device with rotation being described as a representative action and frequency adjustment being described as a representative function, those skilled in the art will realize that the present invention can provide an advantageous slide switch, knob or other shaped input device displayed on the touchscreen panel 114 which can safely receive user inputs for adjusting functional parameters in avionics and other implementations. For example, the present invention provides teachings for knob, slide switch or other touchscreen displayed input devices which adjust avionics parameters such as cabin temperature, flight deck or cabin lighting, flap control or landing gear. It should also be appreciated that the exemplary embodiment or exemplary embodiments are only examples, and are not intended to limit the scope, applicability, or configuration of the invention in any way. For example, while the embodiment of the present invention has been described in accordance with avionic implementations, the present invention is not limited to avionic implementations. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for avionic touchscreen operation, the method comprising the steps of:
  displaying one or more user input devices on a touchscreen panel, the one or more user input devices including a knob;
  receiving user inputs on a face of the touchscreen panel that correspond to rotating the knob at a rotational speed;
  generating input signals in response to the user inputs;
  generating operational signals in response to comparing the input signals to predetermined user input signals;
  adjusting one or more avionic operation parameters in response to the operational signals; and
  providing two or more user sensible outputs in response to the operational signals and in accordance with the user inputs, wherein the step of providing two or more user sensible outputs comprises providing two or more user sensible outputs selected from the group of providing user sensible outputs including providing visual outputs, providing audible outputs and providing tactile outputs by vibrating the touchscreen panel at an amplitude and at a frequency, wherein the frequency varies in accordance with the rotational speed of the knob corresponding to the user inputs received.

2. The method in accordance with claim 1 wherein the step of providing visual outputs comprises the step of altering a visual appearance of the one or more user input devices displayed on the touchscreen panel in response to the operational signals by one or more of changing a size of at least one of the one or more user input devices in accordance with the user inputs, changing a color of at least one of the one or more user input devices in accordance with the user inputs, or changing a legend on at least one of the one or more user input devices in accordance with the user inputs.

3. The method in accordance with claim 1 wherein the step of providing audible outputs comprises the step of providing audio output signals to one or more of a flight crew headset or flight deck speaker system in response to the operational signals and in accordance with the user inputs.

4. The method in accordance with claim 3 wherein the knob is rotatable to one or more detents, and wherein the step of providing audible outputs in response to the operational signals comprises the step of providing an audible click having a predetermined amplitude to indicate the knob being rotated to one of the one or more detents in accordance with the user inputs corresponding to rotating the knob to the one of the one or more detents.

5. The method in accordance with claim 1 wherein the step of providing tactile outputs in response to the operational signals further comprises the step of providing a large amplitude bump to indicate the knob being rotated to one of the one or more detents in accordance with the user inputs corresponding to rotating the knob to the one of the one or more detents.

6. A method for touchscreen operation, the method comprising the steps of:
  displaying one or more user input devices on a touchscreen panel, the one or more user input devices including a knob;
  receiving user inputs on a face of the touchscreen panel that correspond to rotating the knob;
  determining that the user inputs comprise an authenticated user input in response to determining that the user inputs are multitouch user inputs;
  generating input signals in response to the authenticated user input;
  generating operational signals in response to comparing the input signals to predetermined user input signals, the operational signals including selection of one of a coarse parameter adjustment or a fine parameter adjustment;
  providing user sensible output in response to the operational signals and in accordance with the user inputs, the user sensible output comprising providing haptic feedback tactile outputs by selecting a first predetermined frequency and a first predetermined amplitude at which the touchscreen panel is vibrated in response to the coarse parameter adjustment or a second predetermined frequency and a second predetermined amplitude at which the touchscreen panel is vibrated in response to the fine parameter adjustment; and
  adjusting one or more operational parameters in response to the operational signals.

7. The method in accordance with claim 6, wherein the method for touch screen operation comprises a method for avionic touchscreen operation, and wherein the step of displaying the one or more user input devices on the touchscreen panel comprises the step of displaying the one or more user input devices on the touchscreen panel in response to one of a crew input or a flight parameter, and wherein the step of adjusting one or more operation parameters comprises the step of adjusting one or more operation parameters in response to the operational signals and an engagement user input received separate from the user inputs and subsequent to the step of generating the operational signals.

8. The method in accordance with claim 6 wherein the step of receiving user inputs further comprises the step of receiving user input device arming inputs on the face of the touchscreen panel, and wherein the step of providing user sensible output comprises the step of providing visual output on the touchscreen panel in response to the operational signals, wherein the visual output comprises altering a legend on at least one of the one or more user input devices displayed on the touchscreen panel corresponding to the user input device arming inputs.

9. The method in accordance with claim 6 wherein the knob is rotatable to one or more detents, and wherein the step of providing haptic feedback tactile outputs in response to the operational signals includes the step of providing a large amplitude bump to indicate the knob being rotated to one of the one or more detents in accordance with the user inputs corresponding to rotating the knob to the one of the one or more detents.

10. The method in accordance with claim 9 wherein the step of providing user sensible output in response to the operational signals further comprises the step of providing an audible click having a predetermined amplitude to indicate the knob being rotated to one of the one or more detents in accordance with the user inputs corresponding to rotating the knob to the one of the one or more detents.

* * * * *